RUTT and BAER.
Corn Planter.
No. 71,540.
Patented Nov. 26, 1867.
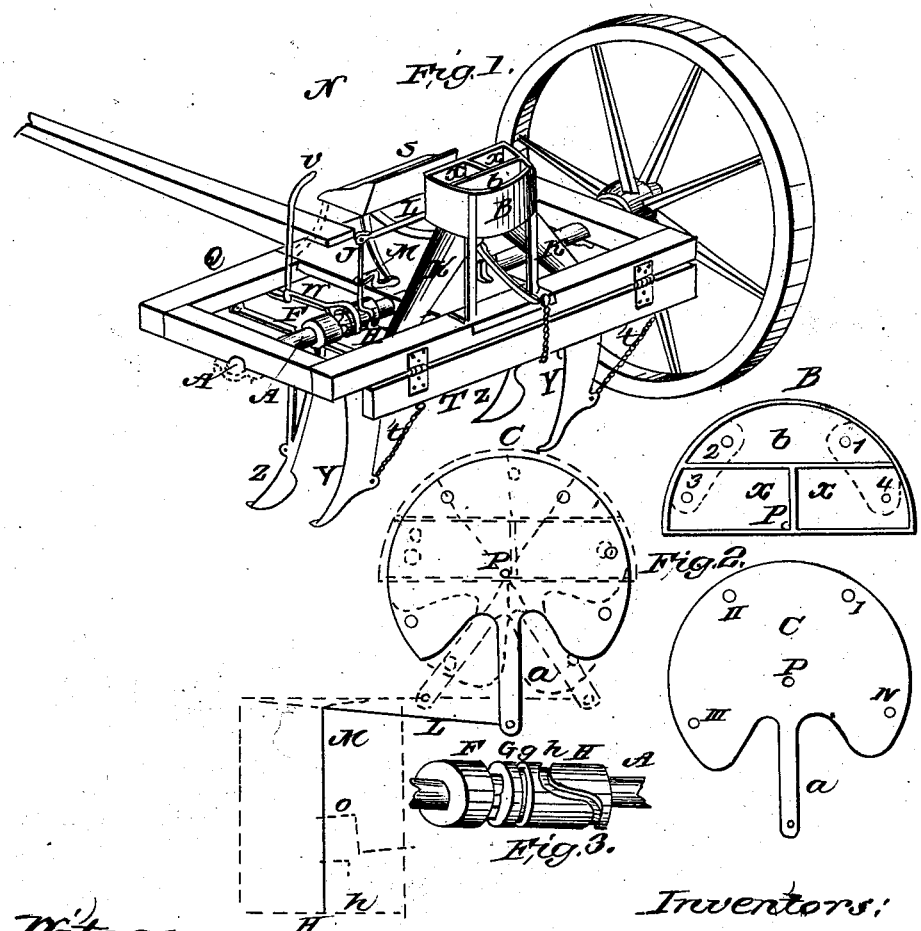
Witnesses:
Wm. B. Wiley
Jacob Stauffer
Inventors:
M. M. Rutt
A. B. Baer

United States Patent Office.

MARTIN M. RUTT AND ADAM B. BAER, OF EAST HEMPFIELD, PENNSYLVANIA.

Letters Patent No. 71,540, dated November 26, 1867.

IMPROVEMENT IN CORN AND SEED-PLANTER.

The Schedule referred to in these Letters Patent and making part of the same.

TO ALL WHOM IT MAY CONCERN:

Be it known that we, MARTIN M. RUTT and ADAM B. BAER, of East Hempfield township, in the county of Lancaster, and State of Pennsylvania, have invented a new and useful Improvement on a Two-Row Double-Hopper Corn or Seed-Planter; and we do hereby declare that the following is a full, clear, and exact description of the construction and operation of the same, reference being had to the accompanying drawings, making a part of this specification, in which—

Figure 1 is a perspective view of the machine with one wheel removed.

Figures 2, illustrations of the vibrating disk in the bottom of the hopper.

Figure 3, the clutch and cam on the axle of the machine for operating the vibrating disk, with its appendages removed.

The nature of our invention consists in providing a vibrating disk, perforated with holes, on a pivot, working on the bottom of a three-chambered hopper in such a manner as to drop into each spout beneath the hopper simultaneously, or at nearly the same time, or alternately plant corn, then corn and pumpkin-seed, or other seed, from distinct compartments in the hopper, scoring and planting two rows at one operation; to which a covering-scraper or shovel and roller may be added to follow.

To enable others skilled in the art to make and use our invention, we will proceed to describe its construction and operation.

We construct our corn-planter on the ordinary plan as regards the frame, scorers, and boots, and means for raising them from the ground, as also the seat, in which we claim no special novelty, only so far as the arrangement is constructed for actuating the seeder.

Fig. 1 shows the combination of the parts, the frame Q supported on the axle A, with a central platform, J, which supports the seat S and hopper B on brackets, as also the fulcrum for the foot-lever to raise the hinged tail-board T, to which the chains $t$ on the rear of the boots Y are hung. The scoring-shovel $z$ is also attached to the same rod, hinged in front to the frame Q in the ordinary manner. The spouts K, one on each side of the hopper, diverge and open into the top of the boot Y. This hopper is divided into three departments, $b\ x\ x$. The anterior divisions are designed for pumpkin-seeds, either for sowing in each alternate row only by using but one of the compartments, or in each row, by putting seed in both compartments. The rounded rear box or division $b$ for corn has two openings, 1 2, figs. 2. Each of the compartments $x$ has but one opening, 3 and 4. The spouts K beneath the hopper, indicated by the dotted lines, open respectively to the two openings of the hopper on each side, 2 3 and 1 4, $b\ x$. On a pivot, P, over the bottom of the hopper, and under the partitions, there is a circular disk or plate, C, with an arm, $a$. This disk has also four perforations, I, II, III, IV. These perforations are on the same radius of a circle, taken from its centre P, the pivot, and so placed that the holes in the disk and those in the hopper, marked I II and 1 2 respectively, coincide when the arm $a$ of the disk is at a right angle to the straight diameter of the hopper-box, and the other two openings, III and IV, of the disk project beyond the hopper, and outside as the arm $a$ is vibrated from one side to the other. These projecting ears are alternately brought within the chambers $x$, and their openings III IV come over the openings 3 4 in the bottom, and discharge their seed into the spout.

The operation is such that corn from the compartment $b$ is twice dropped into each spout to once from the chambers $x$, and it will be perceived that this mode of dropping can be varied. The aid of a brush on the partition over the dropping-orifice may also be employed. The mode of operating the vibrating arm is shown, and will be readily understood by the use of a loose-grooved cam-roller, H, in connection with a clutch, G, and lever, V W, to throw it in or out of gear with a fixed pulley, F, on the axle A of the machine.

The cam-grooves may be varied so as to actuate the vertical rod M in its bearing $o$ two or three times, or oftener, each revolution, being hinged also with a connecting-rod, L, attached to the arm $a$ of the disk which produces the vibrating motion. The shifting and unshifting-clutch might also be actuated simultaneously with the action of the lever for raising and lowering the shovels, so as to dispense with the vertical lever V.

We are aware that a common plough with a seeding-attachment, operating an oscillating disk by means of a rope, is patented, June 13, 1865, which we disclaim; but, as we claim no novelty in the grooved cam, clutch, and lever, separately considered, we deem it needless to make further elucidations.

We are aware, also, that partitioned hoppers are not new, and that revolving disks with perforations have been used; nor do we claim such.

What we claim as our invention, and desire to secure by Letters Patent, is—

1. The arrangement of an oscillating disk, C, with its exserted ears and arms $a$, operating in a hopper provided with several compartments, in the manner and for the purpose specified.

2. In combination with the disk C and its arm $a$, the connecting-rod L, with the arm or rod M, actuated by the grooved cam H, all arranged and operating substantially in the manner specified, the use of the spouts K and appliances shown and specified.

M. M. RUTT,
A. B. BAER.

Witnesses:
    WM. B. WILEY,
    JACOB STAUFFER.